United States Patent Office 3,388,996
Patented June 18, 1968

3,388,996
PROCESS AND PRODUCT OF BAKED GOODS PREPARATION
Hans H. Stockmann, Plainfield, and Dilip K. Ray Chaudhuri, Westfield, N.J., assignors to National Starch and Chemical Corporation, New York, N.Y., a corporation of Delaware
No Drawing. Filed Feb. 12, 1965, Ser. No. 432,394
18 Claims. (Cl. 99—91)

ABSTRACT OF THE DISCLOSURE

A process for preparing baked goods as well as the baked goods resulting therefrom; said process comprising the incorporation of an acyl carboxylic acid derivative, such as, alpha and beta-carboxyethyl (or isopropyl) stearates, behenates, and palmitates, into the raw dough mix prior to the baking thereof. The baked goods thus produced are characterized by their prolonged retention of freshness, fine texture, good color and increased volume.

---

This invention relates to a novel process for the preparation of baked goods as well as to the improved baked goods thereby produced.

It is usually necessary for commercial baked goods in general and for bread in particular, to exhibit certain desirable characteristics including, in particular, prolonged freshness, fine texture, true color and an increased volume. Emulsifier systems and additives such as acyl lactic acid derivatives, have, in the past, been incorporated into baked goods in order to provide anti-staling properties as well as to improve volume and taste qualities. In many instances, the cost of preparing such additives has been high while the beneficial effects upon the resulting baked goods have, unfortunately, been minimal.

It is an object of this invention to prepare baked goods by means of a novel process whereby certain acyl carboxylic acid derivatives are incorporated into the raw dough mixes utilized for their preparation, prior to the baking of the latter mixes. It is a further object to prepare baked goods exhibiting improved properties of prolonged freshness, fine texture, good color and increased volume. Various other objects and advantages of our invention will be apparent from the following description thereof.

The unique acyl carboxylic acid derivatives utilizable in the novel process of this invention correspond to the formula:

$$\begin{array}{c}\text{O}\\\|\\\text{Y}-\text{C}-\text{O}-\text{X}\\|\\\text{O}-\text{C}-(\text{CH}_2)_n-\text{CH}_3\\\|\\\text{O}\end{array}$$

wherein X is an ion selected from the group consisting of hydrogen, alkali metal, alkaline-earth metal and ammonium ions; wherein Y is a radical selected from the group consisting of

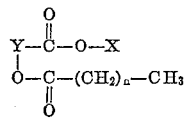, $-\text{CH}_2-\text{C}^1\text{H}_2-$, and $\text{CH}_3-\text{CH}-\text{C}^1\text{H}_2-$ radicals such that said Y group is attached to the carbon atoms of the adjacent carbonyl group, e.g.

via the $C^1$ atom of said Y group; and, wherein $n$ is an integar having a value of from 14 to 20 inclusive.

Thus, for example, when X in the above formula is a hydrogen ion, Y a

radical and $n$ is 14, the resulting compound is referred to as alpha-carboxyisopropyl palmitate. Similarly, when X is a sodium ion, Y a $-\text{CH}_2-\text{C}^1\text{H}_2-$ radical and $n$ is 16, the resulting compound is referred to as the sodium salt of beta-carboxyethyl stearate, and when X is a calcium ion, Y a

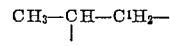

radical and $n$ is 20, the resulting compound is referred to as the calcium salt of beta-carboxyisopropyl behenate.

An inspection of the above formula reveals the potential for preparing similar compounds wherein the acyl radical

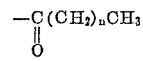

may contain less than 16 carbon atoms and more than 22 carbon atoms. The scope of this invention, however, is limited to the use of compounds containing from 16 to 22 carbon atoms in the acyl radical because of the marked improvement in the properties of baked goods when acyl derivatives coming within the latter range of carbons are incorporated therein. In contrast, the ester products falling outside this required range fail to provide a beneficial effect. Furthermore, when esters containing short chain, i.e. less than 16 carbon atoms, acyl radicals are incorporated in baked goods, their net effect is to accelerate the deterioration of the baked goods.

Methoods for preparing the ester acids and ester salts utilizable in the novel process of this invention are known to those skilled in the art. However, more specific information relating to their preparation may be found in our copending application, Ser. No. 421,611, filed Dec. 28, 1964, now abandoned and in U.S. Patents 2,449,990 and 2,568,634. Thus, it will be seen that the ester acids may be prepared by reacting certain alpha and beta-hydroxy carboxylic acids with either fatty acids, fatty acid halides or fatty alcohols containing from 16 to 22 carbon atoms inclusive. When acyl, i.e. fatty acid, halides are utilized in the reaction, the system should be provided with means for removing the hydrogen chloride generated. The preparation of the beta substituted ester acids is usually carried out in the presence of a mineral or aromatic acid catalyst such, for example, as sulfuric acid, phosphoric acid or benzene sulfonic acid. The ester acids are thus prepared as fine, white crystalline materials.

The alkali metal, alkaline-earth metal and ammonium salts of the above described ester acids improve the essential properties of the baked goods in which they are incorporated to a greater extent than their corresponding ester acids. As has been previously mentioned, the preparation of these ester salts is well known to those skilled in the art. Thus, the ester acids may be reacted, in alcohol solutions, with alkali metal salts, alkali metal hydroxides, salts of alkaline-earth metals, ammonium salts, etc. in order to prepare the required ester salts. Needless to say, there are other acceptable procedures for the preparation of the ester salts.

Also well known to those skilled in the art, are the basic means of preparing various types of baked goods wherein the novel additives of this invention may be incorporated. Thus, bread may be prepared by the combination of basic ingredients such as flour, yeast, water and salt, in a "sponge and dough" procedure. Other ingredients such, for example, as sugar, milk and shortening may be included for the preparation of commercial breads, while eggs and leavening agents are added in the preparation of cakes. It should be noted that any suitable recipes for baked goods may be utilized in the novel process of this invention and that it is the intention of this invention to cover the preparation of a wide range of improved baked goods, e.g. breads, cakes, rolls, buns, etc.

In practising the novel process of this invention, it is necessary that the ester acids and ester salts utilizable therein be incorporated in the raw dough mix being utilized, prior to the baking of the latter. The additives should be present in the latter raw dough mixes in concentrations of from about 0.1 to 2.0%, as based on the weight of flour in the raw dough mix. Thus, the ester acids and the water soluble ester salts may be dissolved in a portion of the total water content which may be at a temperature of from about 25 to 80° C.; the resulting hot, aqueous solution then being dispersed in the flour or, the insoluble ester salts can be dissolved in the liquified fat constituent of the formulation and thereby incorporated in the dough. Both methods of addition are acceptable since neither has any adverse effect on the properties of the resulting baked goods. In any event, it is essential that there should be a complete and uniform dispersal of the additive and any methods capable of providing such intimate dispersion without deleteriously affecting the resultant product are acceptable for use in this process.

The inclusion of the ester acids and ester salts by the novel process of this invention, provides the resulting baked goods with many desirable qualities. Thus, the shelf-life of the baked goods is greatly extended in that firming and staling tendencies are retarded. Light, fluffy products with increased volume are obtained. Furthermore, the baked goods are provided with a fine texture, thus insuring the elimination of a coarse, stringy grain. The natural color of the baked goods is also reinforced. Thus, for example, white bread exhibits a truer, whiter color. In addition, the baked goods prepared by the process of this invention display both a pleasant flavor and aroma.

The following examples will more fully illustrate the embodiment of this invention. In these examples, all parts given are by weight unless otherwise noted.

Example I.—This example illustrates the preparation of white bread by means of the novel process of this invention, whereby unique additives are included in the dough mix. It further illustrates the improved properties of the resulting white bread.

The white bread was prepared using the "sponge-dough" procedure. In preparing the sponge, the following ingredients were utilized; their concentrations, on a percentage basis, being calculated upon the total weight of flour which was utilized.

|  | Percent |
|---|---|
| Flour | 70.0 |
| Lard | 2.0 |
| Yeast | 2.5 |
| Yeast food | 0.75 |
| Water | 37.5 |

The sponge resulting from the admixture of the above ingredients was mixed for three minutes at a slow speed, i.e. 40 r.p.m., while its temperature was maintained at 80° F. Thereafter, the sponge was fermented for a period of 4¾ hours in a fermentation cabinet which was maintained at a constant temperature of 80° F. and a relative humidity of 91%.

After the sponge fermentation period, the following ingredients, in concentrations calculated upon the total weight of flour utilized, were added and the complete mix was blended for two minutes at the above noted slow speed and for four minutes at a higher speed, i.e. 90 r.p.m.

|  | Percent |
|---|---|
| Flour | 30.0 |
| Corn sugar | 8.0 |
| Non-fat milk solids | 3.0 |
| Salt | 2.0 |
| Water | 24.5 |
| Sodium salt of alpha-carboxyisopropyl stearate | 0.5 |

The above mentioned sodium salt was dissolved in part of the total water content which was at a temperature of 25° C. and thus incorporated into the dough mix.

During the mixing procedure, the temperature of the dough was maintained at 80° F. After mixing, the dough was kept in the fermentation cabinet, under the above stated atmospheric conditions, for a total of 45 minutes floor time. At this point, three pieces, each weighing 325 grams, were removed from the dough, rounded and rested for 10 minutes before molding. The dough pieces were thereupon molded and panned in 2¼ inch deep baking pans whose top and bottom dimensions were, respectively, 7½" x 3½" and 6¾" x 3".

The panned dough pieces were then proofed, i.e. raised, to the desired volume in a proofing cabinet maintained at a temperature of 104° F. and a relative humidity of 80%. The panned dough was then baked for 21 minutes at a temperature of 431° F. The bread was taken from the oven, depanned and allowed to cool to room temperature over a period of 18 hours.

Once cooled, each loaf was weighed and its volume determined by measuring the volume of poppy seed displaced when the loaf of bread was placed into a known volume of poppy seed. The loaves were then sliced into one centimeter thick sections. These sections were packaged in polyethylene bags which were then closed so as to form an air-tight seal and stored at a constant temperature of 73° F. and a relative humidity of 50% to await further testing procedures.

Compressibility tests, i.e. determination of the measure of softness, were conducted on the center cuts of the above prepared, one centimeter thick bread slices. After conditioning the slices for 24 hours at room temperature, compressibility was measured using a penetrometer having a plunger 1 cm. in diameter and weighing 47.53 grams. The plunger was allowed to penetrate into different points of the slice for a period of 15 seconds at each point of penetration, at which time, its movement was arrested and the depth of penetration measured with a dial micrometer calibrated in tenths of a millimeter. An average of twelve such readings were taken on slices which had been removed from three different loaves.

Subjective tests were also conducted on slices which had been stored at room temperature for periods of 24 and 48 hours. Thus, softness and grain appearance were respectively evaluated on a scale wherein a high score of 10 was assigned to the samples having the highest ratings in each of the latter properties.

The results summarized in the following table, clearly indicate the improved qualities of bread prepared by means of the novel process of this invention. Data obtained from tests performed on samples of white bread which did not contain any additives and on samples of white bread containing alpha-carboxyisopropyl stearate was included in the table in order to present a clearer and more direct comparison and also to indicate the superior results obtained when ester salts, such as the sodium salt of alpha-carboxyisopropyl stearate, are utilized as baked goods additives in the process of this invention.

These latter breads were prepared in an identical manner to the procedure described hereinabove.

| Additive | Compressibility (mm. × 10⁻¹) | Average Weight (grams) | Average Volume (ml.) | Subjective Test | | | |
|---|---|---|---|---|---|---|---|
| | | | | 24 hours | | 48 hours | |
| | | | | Softness | Grain | Softness | Grain |
| Control | 51 | 281 | 936 | 6 | 4 | 1 | 4 |
| Alpha-carboxyisopropyl stearate | 52 | 287 | 983 | 7 | 7 | 7 | 7 |
| Sodium salt of alpha-carboxyisopropyl stearate | 60 | 285 | 1,061 | 9 | 9 | 9 | 9 |

Example II.—This example compares the excellent results obtained when utilizing esters and ester salts of fatty acids containing from 16 to 22 carbon atoms as baked goods additives, as against the results obtained when using ester acids and ester salts containing less than 16 carbon atoms in the acyl radical.

The procedures utilized for the preparation and evaluation of the finished baked goods of this example were identical to those described in Example I, hereinabove. The only distinction from the latter example was that, in this instance, the additives consisted of esters and ester salts of fatty acids containing 12 carbon atoms, i.e. laurates, and 16 carbon atoms, i.e. palmitates, as well as 18 carbon atoms, i.e. stearates.

The results summarized below, clearly indicate that superior baked goods are obtained when the additives incorporated therein are esters or ester salts of fatty acids containing from 16 to 22 carbon atoms. It should be further noted that the use of additives falling outisde this prescribed range, e.g. 12 carbon atoms, does not enhance the quality of the baked goods but serves instead to accelerate the deterioration of said baked goods.

Summarizing, our invention provides a unique process for the preparation of superior baked goods.

Variations may be made in proportions, procedures and materials without departing from the scope of this invention which is limited only by the following claims.

What is claimed is:

1. A process for the preparation of baked edible goods of flour which comprises incorporating into the raw dough mix, prior to the baking thereof, an additive selected from the group consisting of:

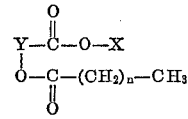

wherein X is an ion selected from the group consisting of hydrogen, alkali metal, alkaline-earth metal and ammonium ions; wherein Y is a radical selected from the group consisting of

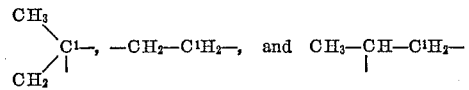

| Additive | Compressibility (mm. × 10⁻¹) | Average Weight (grams) | Average Volume (ml.) | Subjective Test | | | |
|---|---|---|---|---|---|---|---|
| | | | | 24 hours | | 48 hours | |
| | | | | Softness | Grain | Softness | Grain |
| Control | 51 | 281 | 936 | 6 | 4 | 1 | 4 |
| Sodium salt of alpha-carboxyisopropyl laurate | 7 | 297 | 450 | 0 | 0 | 0 | 0 |
| Sodium salt of alpha-carboxyisopropyl palmitate | 63 | 280 | 1,021 | 7 | 7 | 7 | 7 |
| Sodium salt of alpha-carboxyisopropyl stearate | 60 | 285 | 1,061 | 9 | 9 | 9 | 9 |
| Control | 33 | 283 | 1,056 | 6 | 4 | 2 | 4 |
| Sodium salt of beta-carboxyisopropyl laurate | 7 | 291 | 591 | 0 | 0 | 0 | 0 |
| Beta-carboxyisopropyl palmitate | 34 | 283 | 1,078 | 7 | 6 | 6 | 6 |

Example III.—This example further illustrates the novel process of this invention and the improved baked goods derived therefrom.

The procedures utilized for the preparation and evaluation of the finished baked goods of this example were identical to those described in Example I, hereinabove. The additives utilized in the preparations of this example included a variety of sodium, calcium and ammonium ester salts. It should be noted, that the calcium salts were effectively and uniformly dispersed through the dough by being dissolved in liquefied lard, the resulting solution thereupon being blended with the flour.

The results summarized below, further indicate that the quality of baked goods is enhanced by the addition, thereto, of a variety of ester acids and ester salts by means of the novel process of this invention.

radicals, such that said Y group is attached to the carbon atom of the adjacent carbonyl group via the $C^1$ atom of said Y group; and, wherein $n$ is an integer having a value of from 14 to 20 inclusive.

2. The process of claim 1, wherein said additive is present in said raw dough mix in a concentration of from about 0.1 to 2.0%, as based on the weight of flour in said dough mix.

3. The process of claim 1, wherein said additive is the sodium salt of beta-carboxyethyl stearate.

4. The process of claim 1, wherein said additive is the sodium salt of alpha-carboxyisopropyl stearate.

5. The process of claim 1, wherein said additive is the sodium salt of beta-carboxyethyl behenate.

6. The process of claim 1, wherein said additive is the sodium salt of beta-carboxyisopropyl palmitate.

| Additive | Compressibility (mm. × 10⁻¹) | Average Weight (grams) | Average Volume (ml.) | Subjective Test | | | |
|---|---|---|---|---|---|---|---|
| | | | | 24 hours | | 48 hours | |
| | | | | Softness | Grain | Softness | Grain |
| Control* | 38 | 276 | 1,125 | 2 | 7 | 2 | 7 |
| Sodium salt of beta-carboxyethyl palmitate | 46 | 277 | 1,125 | 9 | 9 | 9 | 9 |
| Sodium salt of beta-carboxyisopropyl palmitate | 43 | 278 | 1,177 | 8 | 7 | 7 | 7 |
| Sodium salt of beta-carboxyisopropyl stearate | 42 | 282 | 1,125 | 6 | 7 | 6 | 7 |
| Control* | 40 | 284 | 990 | 3 | 5 | 3 | 5 |
| Ammonium salt of alpha-carboxyisopropyl stearate | 45 | 284 | 1,027 | 6 | 5 | 7 | 9 |
| Control* | 36 | 282 | 988 | 5 | 5 | 5 | 5 |
| Sodium salt of alpha-carboxyisopropyl behenate | 41 | 282 | 1,045 | 7 | 7 | 7 | 7 |
| Sodium salt of beta-carboxyethyl behenate | 41 | 281 | 1,103 | 7 | 8 | 9 | 7 |
| Control* | 33 | 283 | 1,025 | 6 | 6 | 5 | 6 |
| Calcium salt of alpha-carboxyisopropyl stearate | 44 | 279 | 1,188 | 9 | 9 | 9 | 9 |
| Control* | 42 | 283 | 922 | 4 | 5 | 2 | 5 |
| Sodium salt of beta-carboxyethyl stearate | 52 | 282 | 1,060 | 9 | 9 | 9 | 9 |

*Since a comparative test for baked goods is only valid where the baked goods samples are prepared simultaneously, a control was therefore included with each test series.

7. A raw dough mix comprising flour-water-shortening for use in the preparation of baked goods, said dough mix having intimately admixed therein an additive selected from the group consisting of:

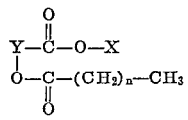

wherein X is an ion selected from the group consisting of hydrogen, alkali metal, alkaline-earth metal and ammonium ions; wherein Y is a radical selected from the group consisting of

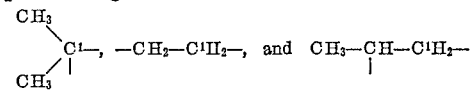

radicals, such that said Y group is attached to the carbon atom of the adjacent carbonyl group via the $C^1$ atom of said Y group; and, wherein $n$ is an integer having a value of from 14 to 20 inclusive.

8. The raw dough mix of claim 7, wherein said additive is present in a concentration of from about 0.1 to 2.0%, as based on the weight of flour therein.

9. The raw dough mix of claim 7, wherein said additive is the sodium salt of beta-carboxyethyl stearate.

10. The raw dough mix of claim 7, wherein said additive is the sodium salt of alpha-carboxyisopropyl stearate.

11. The raw dough mix of claim 7, wherein said additive is the sodium salt of beta-carboxyethyl behenate.

12. The raw dough mix of claim 7, wherein said additive is the sodium salt of beta-carboxyisopropyl palmitate.

13. A finished baked edible product having intimately admixed therein an additive selected from the group consisting of:

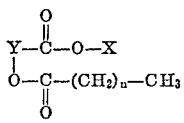

wherein X is an ion selected from the group consisting of hydrogen, alkali metal, alkaline-earth metal and ammonium ions; wherein Y is a radical selected from the group consisting of

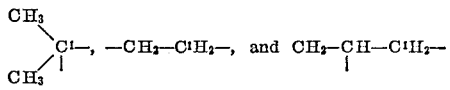

radicals, such that said Y group is attached to the carbon atom of the adjacent carbonyl group via the $C^1$ atom of said Y group; and, wherein $n$ is an integer having a value of from 14 to 20 inclusive.

14. The baked product of claim 13, wherein said additive is present in a concentration of from about 0.1 to 2.0%, as based on the weight of flour in said baked product.

15. The baked goods product of claim 13, wherein said additive is the sodium salt of beta-carboxyethyl stearate.

16. The baked goods product of claim 13, wherein said additive is the sodium salt of alpha-carboxyisopropyl stearate.

17. The baked goods product of claim 13, wherein said additive is the sodium salt of beta-carboxyethyl behenate.

18. The baked goods product of claim 13, wherein said additive is the sodium salt of beta-carboxyisopropyl palmitate.

References Cited

UNITED STATES PATENTS

| | | | |
|---|---|---|---|
| 2,789,992 | 4/1957 | Thompson et al. | 99—91 X |
| 3,141,030 | 7/1964 | Buddemeyer et al. | 99—91 X |

FOREIGN PATENTS

| | | |
|---|---|---|
| 576,055 | 3/1946 | Great Britain. |
| 652,006 | 4/1951 | Great Britain. |

LIONEL M. SHAPIRO, *Primary Examiner.*

J. M. GOLIAN, *Examiner.*